(12) United States Patent
Good

(10) Patent No.: US 12,026,848 B1
(45) Date of Patent: Jul. 2, 2024

(54) SYSTEMS AND METHODS FOR PRESERVING IMAGE QUALITY AFTER DECIMATION

(71) Applicant: Illuscio, Inc., Culver City, CA (US)

(72) Inventor: Max Good, Culver City, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/493,028

(22) Filed: Oct. 24, 2023

(51) Int. Cl.
| G06T 15/50 | (2011.01) |
| G06T 3/4023 | (2024.01) |
| G06T 7/40 | (2017.01) |
| G06T 7/70 | (2017.01) |
| G06T 15/06 | (2011.01) |
| G06T 17/20 | (2006.01) |

(52) U.S. Cl.
CPC ............. *G06T 3/4023* (2013.01); *G06T 7/40* (2013.01); *G06T 7/70* (2017.01); *G06T 15/06* (2013.01); *G06T 15/506* (2013.01); *G06T 17/20* (2013.01); *G06T 2200/04* (2013.01)

(58) Field of Classification Search
CPC .................................................. G06T 17/205
See application file for complete search history.

(56) References Cited

U.S. PATENT DOCUMENTS

| 6,208,347 B1 * | 3/2001 | Migdal ................. G06T 15/00 345/419 |
| 2021/0183144 A1 * | 6/2021 | Hunt ...................... G06T 19/20 |

FOREIGN PATENT DOCUMENTS

| WO | WO-2022037506 A1 * | 2/2022 | ........... G06T 15/005 |

OTHER PUBLICATIONS

Machine translation of WO 2022/037506 A1 (Year: 2022).*

* cited by examiner

*Primary Examiner* — Ryan McCulley
(74) *Attorney, Agent, or Firm* — Ansari Katiraei LLP; Arman Katiraei; Sadiq Ansari

(57) ABSTRACT

Disclosed is a graphics system and associated methods for preserving or improving image quality when rendering a decimated image or three-dimensional ("3D") that has been decimated to remove some primitives from the original representation of the undecimated image or 3D model. The graphics system receives decimated primitives that are defined with a position, visual characteristics, and at least first and second surface normals. The graphics system defines a light source for illuminating the decimated primitives, determines that the second surface normal of a particular decimated primitive receives more light from the light source than the first surface normal of the particular decimated primitive, and generates a visualization for the particular primitive at the position of the particular primitive with the visual characteristics of the particular primitive adjusted according to an amount of light from the light source reaching the particular primitive via the second surface normal.

20 Claims, 8 Drawing Sheets

SYSTEMS AND METHODS FOR PRESERVING IMAGE QUALITY AFTER DECIMATION

BACKGROUND

High-resolution images and three-dimensional ("3D") images have large file sizes. The large file sizes and the amount of data associated with these images increase the time required to transfer the files over a network or from one device to another. The large file sizes also increase the time and/or resources required to process, edit, render, and/or otherwise work with the images.

Image decimation reduces the file size in a different manner than compression. Image decimation involves removing data from the image including removing pixels, meshes, polygons, points, or other primitives that give the image its resolution or detail. The removal of the image data reduces image quality in at least two ways. Detail is lost as fewer primitives remain to define the shape and form of the represented object or scene. Additionally, the lighting of the represented object is impacted. For instance, a surface, especially a curved surface, that has a gradually changing appearance based on light reflecting off the surface may have more abrupt changes in appearance because the surface is represented with fewer primitives and with greater positional shifts between remaining primitives of the surface. More specifically, the light may reflect off neighboring points on a decimated curved surface at a greater angle since there are fewer primitives to represent that curved surface. Consequently, the lighting and color transitions across the decimated curved surface become more abrupt, less accurate, and less realistic which further lowers the image quality beyond representing the decimated curved surface with fewer primitives.

DETAILED DESCRIPTION OF PREFERRED EMBODIMENTS

The following detailed description refers to the accompanying drawings. The same reference numbers in different drawings may identify the same or similar elements.

Provided are systems and associated methods for preserving image quality after decimation. The systems and associated methods involve decimating an image without discarding the surface normals of the primitives that are removed during decimation so that the object or scene represented by the remaining decimated primitives of the image may be relit with the same lighting and color accuracy as the undecimated or original image.

A graphics system merges the surface normals of image primitives that are selected for removal during decimation with the surface normals of neighboring or substitute image primitives that are retained after decimation. The merging results in image primitives that are defined with two or more surface normals.

The graphics system lights the decimated image by reflecting light from a light source off the surface normal of a primitive that is directed closest to the light source, by calculating the effect that the light has on the visual characteristics of that primitive based on the reflection off the selected surface normal, and by rendering the primitive based on the calculated effect of the light on the visual characteristics. Accordingly, the remaining set of decimated primitives are relit with the same smooth lighting and color transitions as the original or undecimated image. Specifically, by retaining the surface normal data of primitives that are removed from a curved surface, the graphics system may render the remaining primitives of the curved surface as a lower resolution with the same smooth and gradual lighting and color transitions as the undecimated curved surface. The graphics system preserves the image quality after decimation by retaining lighting and color accuracy so that decimated curved and/or other shaped surfaces do not have abrupt and sudden transitions resulting from light reflecting in completely different or largely varying directions off neighboring primitives representing the decimated surface.

The graphics system may preserve the image detail across different types of decimated images. The images may include two-dimensional ("2D") images in which the decimation involves removing pixels from the 2D images, and may include various three-dimensional ("3D") image formats or representations. For instance, a 3D object or model may be represented as a connected set of meshes or polygons. Alternatively, the same 3D object or model may be represented as disconnected points of a point cloud or other primitives of another 3D image format.

Figure 1:
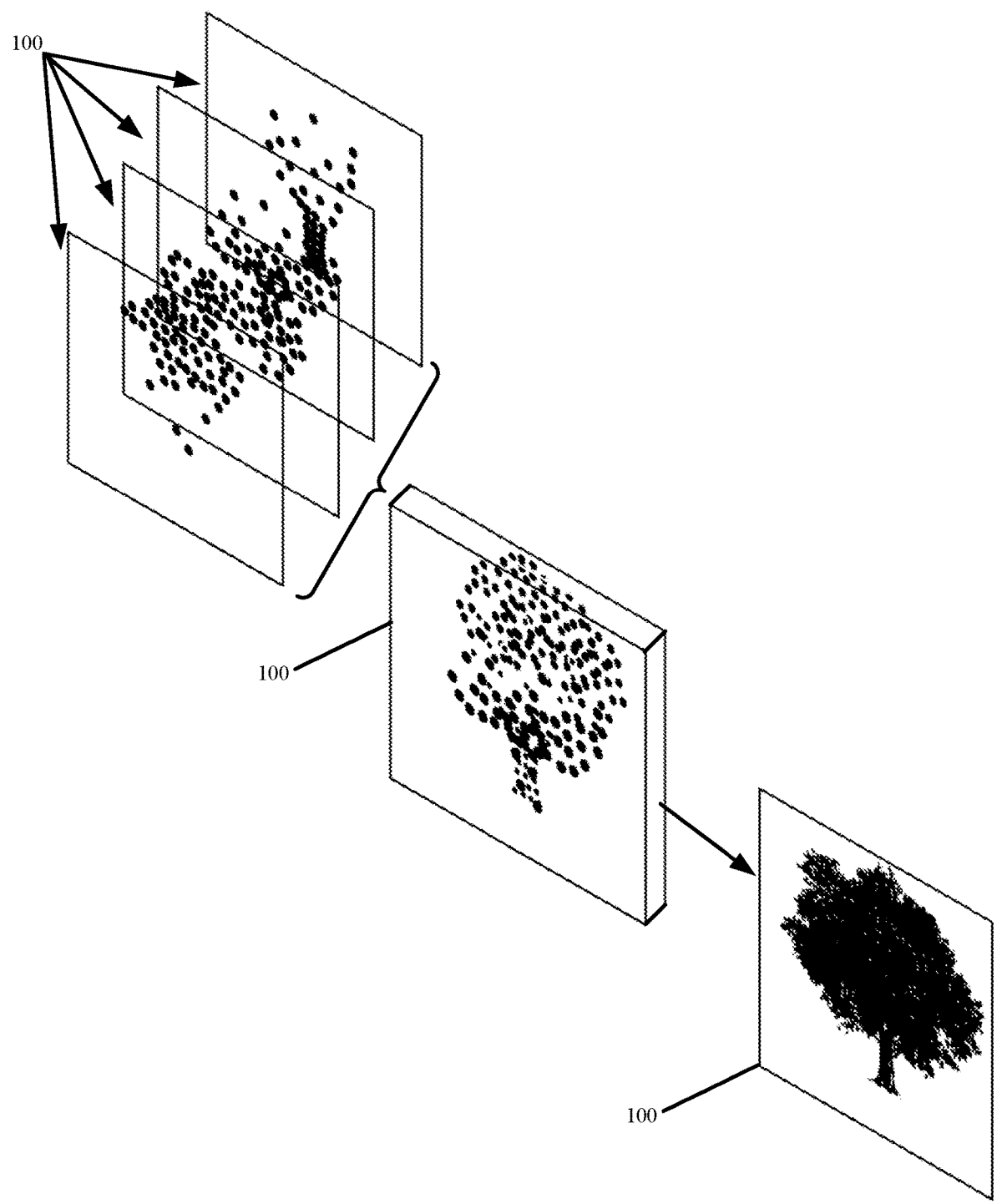
FIG. 1 illustrates an example point cloud in accordance with some embodiments presented herein.

FIG. 1 illustrates an example point cloud 100 in accordance with some embodiments presented herein. Point cloud 100 may represent a 3D object or a 3D scene with points that are distributed in a 3D space to collectively generate the shape and visual characteristics of the 3D object or scene. Accordingly, the points are the primitives for constructing the 3D object or scene as a point cloud. Other 3D models or formats may use meshes or polygons as the primitives to generate the shape and visual characteristics of the 3D object or scene.

The points of point cloud 100 differ from pixels of a 2D image, because certain regions of point cloud 100 may have no points, lower densities of points, and/or higher densities of points based on varying amounts of visual information that is defined, detected, or scanned at those regions. Additionally, the position of the point cloud points may be defined in 3D space using x, y, and z coordinate values. In contrast, pixels of a 2D image are defined in 2D space and have a uniform density or fixed arrangement that is defined by the resolution of the 2D image. In other words, the point cloud points may have a non-uniform placement or positioning, whereas the 2D image may have pixel data for each pixel of a defined resolution (e.g., 640×480, 800×600, etc.).

The points of point cloud 100 also differ from meshes or polygons of a 3D mesh model in that the points are disconnected from one another whereas the meshes or polygons are connected in order to create the shape or form of a represented 3D object. Moreover, the meshes or polygons may be stretched or skewed to change the overall shape of the represented 3D object, whereas the points are typically of a fixed size and/or shape.

Each point cloud point may be defined with a plurality of elements. The plurality of elements may include a first set of positional elements and a second set of non-positional or descriptive elements.

The positional elements may be defined with coordinates in a 3D space. For instance, each point cloud point may include x-coordinate, y-coordinate, and z-coordinate elements to capture the position of an imaged surface, feature, or article of the 3D object or the 3D environment in the 3D space.

The positional elements may also include a surface normal. The surface normal defines the angle, direction, or orientation that the surface, feature, or article of the 3D object or the 3D environment represented by the point cloud point faces or is exposed to. More specifically, the surface normal for a particular point is a line, ray, or vector that is perpendicular to the surface, feature, or article represented by that particular point.

The non-positional elements may include information about the detected characteristics of the surface, feature, or article imaged at a corresponding position in the 3D space. The characteristics may correspond to a detected color. The color may be represented using red, green, blue ("RGB"), and/or other values. In some embodiments, the characteristics may provide the chrominance, hardness, translucence, reflectivity, luminance, metallic characteristics, roughness, specular, diffuse, albedo, index of refraction ("TOR"), and/or other properties of the imaged surface, feature, or article. In some embodiments, the non-positional elements may directly identify a material property or other classification for a point. For instance, a first point may be defined with a non-positional element with a value that identifies the material property of "aluminum", a second point may be defined with a non-positional element with a value that identifies the material property of "steel", and a third point may be defined with a non-positional element with a value that identifies the material property of "plastic".

In some embodiments, the characteristics may be related to properties of the device used to generate each of the points. For instance, the characteristics may include a Tesla strength value to quantify the strength of the magnetic field that was used in detecting and/or imaging the surface, feature, or article represented by a particular point cloud point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding point in the 3D space.

Each point cloud point may include an array of elements. The array of elements may provide the positioning of the point in the 3D space as well as one or more characteristics of that point. For instance, a point cloud point may be stored and/or represented as an array of elements with some combination of x-coordinate, y-coordinate, z-coordinate, red, green, blue, chrominance, hardness, translucence, reflectivity, luminance, metallic characteristics, roughness, specular, diffuse, albedo, IOR, tesla, and/or other values.

Point cloud 100 and the individual points of point cloud 100 may be generated by a 3D or depth-sensing camera, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for 3D objects, volumetric objects, or 3D environments. Point cloud 100 may be generated from output of two or more devices. For instance, a first imaging device (e.g., a LiDAR sensor) may determine the position for each point in the 3D space, and a second imaging device (e.g., a high-resolution camera) may measure or capture the characteristics or other non-positional information for each point. One or more photogrammetry techniques may be used to consolidate the data from the first imaging device and the second imaging device, and to create point cloud 100.

Figure 2:
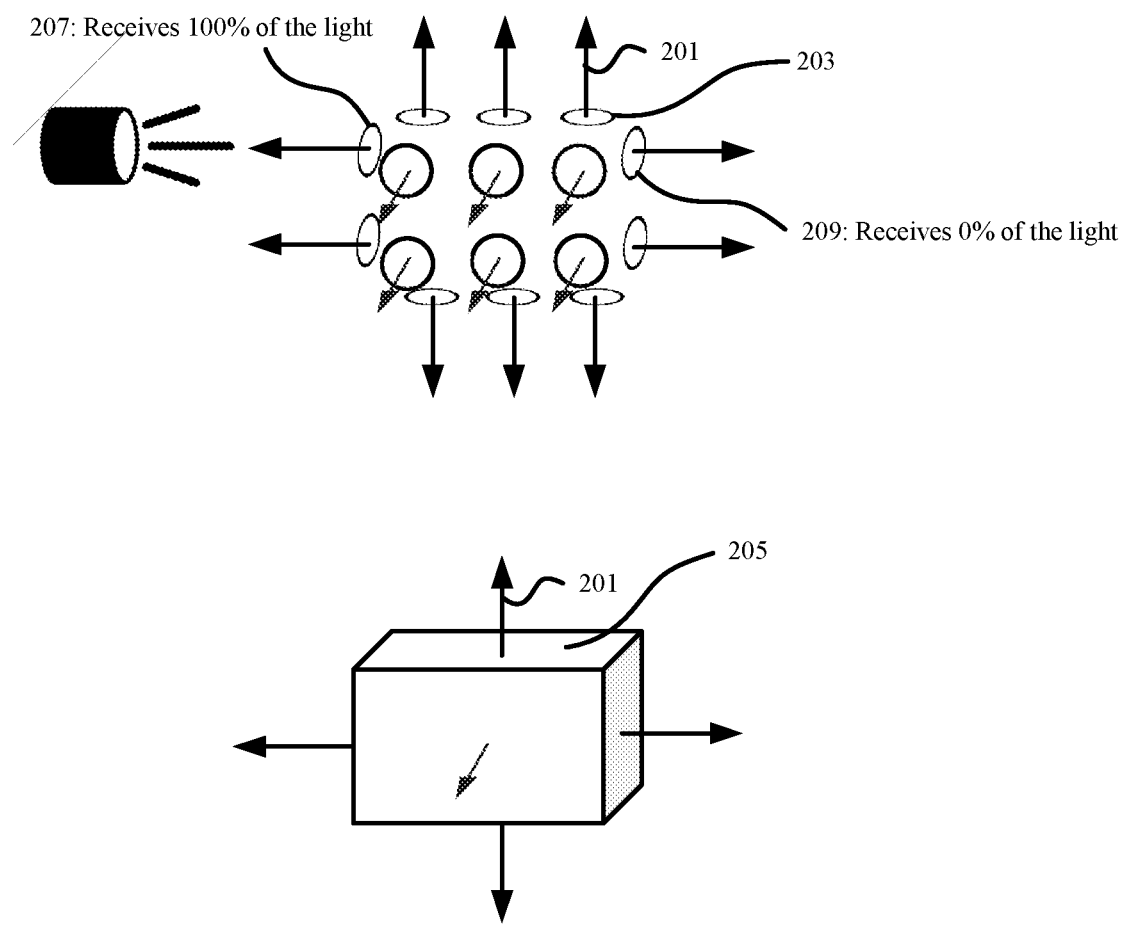
FIG. 2 illustrates an example of the surface normal information that is encoded with each primitive of a three-dimensional ("3D") model or representation in accordance with some embodiments presented herein.

FIG. 2 illustrates an example of the surface normal information that is encoded with each primitive of a 3D model or representation in accordance with some embodiments presented herein. A surface normal 201 may be defined for each primitive 203 or 205, and may represent or specify the direction or angle of the primitive. Specifically, the surface normal may represent or specify the direction or angle of the exposed face or side of the primitive.

The surface normal may represent the curvature or directionality of a surface, and may be used to determine how the non-positional elements of the primitive defined with that surface normal are affected by light. Specifically, the graphics system determines the direction or angle of a particular primitive's surface normal relative to the direction or angle of the emitted light, and computes how much of the light is absorbed or reflected off that particular primitive based on the determination.

In some embodiments, the graphics system may compute brightness and color adjustments to make to the non-positional elements of each primitive based on the intensity, color, and type of light used to illuminate the primitives and the interaction between the light and the primitive as determined by the surface normal of the primitive. For instance, a light ray or beam emitted directly at the surface normal of first primitive 207 will increase the brightness with which that first primitive 207 is presented and will adjust the color values of first primitive 207 by a first amount depending on the difference between the color of the light and the color values defined for first primitive 207. Conversely, a light ray or beam emitted in the same direction or angle as the surface normal of second primitive 209 will result in no brightness increase to second primitive 209 and no change to the color values of second primitive 209 since second primitive 209, by virtue of the surface normal direction or angle relative to the emitted light ray or beam, does not absorb or reflect any of the light.

The brightness and color adjustments may be computed for each point of a point cloud based on the surface normal that is defined for each point of the point cloud and the non-positional element or visual characteristics (e.g., the color components) defined for each point. The brightness and color adjustments may also be computed for meshes of a 3D polygonal model or representation when the surface normals are defined for the meshes.

Figure 3:
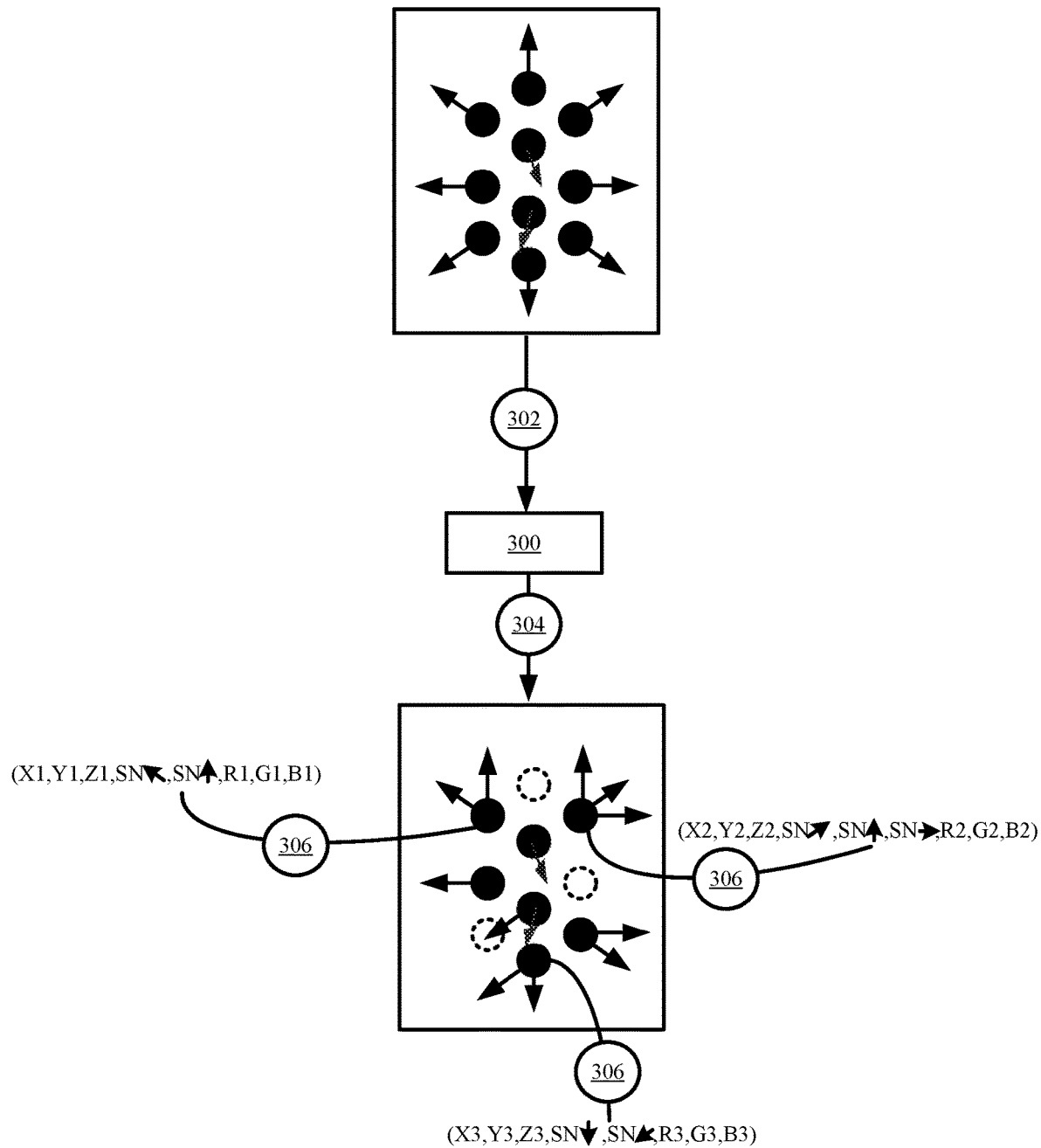
FIG. 3 illustrates an example of retaining the surface normal information after decimating points of a point cloud in order to improve image quality of the decimated point cloud in accordance with some embodiments presented herein.

FIG. 3 illustrates an example of retaining the surface normal information after decimating points of a point cloud in order to improve image quality of the decimated point cloud in accordance with some embodiments presented herein. Graphics system 300 receives (at 302) a set of points of a point cloud. For instance, a user may select, open, load, or otherwise request access to the point cloud. Graphics system 300 may include one or more devices with processor, memory, network, storage, and/or other hardware resources for viewing, editing, rendering, manipulating, and/or otherwise processing 3D models or image formats including point clouds, mesh models, and the like.

Graphics system 300 generates a user interface to present the set of points. In some embodiments, the set of points are presented with their surface normals. In some other embodiments, the set of points are presented without their surface normals and are rendered based on their defined positional and non-positional elements. One or more users may interact with the set of points via the user interface. The interactions may include changing the positioning or visual characteristics of the points, adding new points, or decimating the points to reduce the file size by removing one or more the points.

Graphics system 300 decimates (at 304) the received (at 302) set of points to a decimated set of points. Graphics system 300 may decimate (at 304) the point cloud in response to user input or in response to determining that the file size of the point cloud exceeds a size threshold or that the user experience has been degraded due to the number of points and size of the point cloud relative to the resources available to graphics system 300. For instance, the user input may specify reducing the point cloud size so that it may be transferred with less delay over a data network. Alternatively, graphics system 300 may determine that the frame rate associated with rendering the point cloud falls below a desired threshold, and may decimate (at 304) the point cloud to improve the frame rate.

Decimating (at 304) the received (at 302) set of points may include removing a subset of the points. The subset of the points may be manually selected with the user input. The subset of the points may be programmatically selected based on decimation criteria. For instance, the decimation criteria may specify removal of every third point in the point cloud, or may specify removing one of two or more neighboring points that have visual characteristic commonality (e.g., the same color values) and retaining neighboring points that lack visual characteristic commonality.

As part of decimating (at 304) the point cloud, graphics system 300 attributes the surface normals of the removed points to retained points that neighbor or are positioned within close proximity to the removed points. In some embodiments, graphics system 300 performs a selective attribution of the surface normals to neighboring retained points that have positional or non-positional commonality with the removed points. For example, a first point selected for removal may neighbor a second point that has different color values than the first point, and may neighbor a third point that has similar or common color values as the first point. In this example, graphic system 300 attributes or assigns the surface normal of the first point to the third point instead of the second point due to the commonality between the first point and the third point. Third point retains the surface normal that was originally defined for the third point and inherits and/or is defined with a second surface normal of the first point as a result of decimating the first point.

Accordingly, after decimating (at 304) the point cloud, graphics system 300 redefines or reencodes (at 306) the decimated set of points with one or more surface normals. Some points of the decimated set of points may be defined with their original surface normal, and other points may be defined with their original surface normal and the surface normal of one or more other points that were removed during the decimation (at 304) processed, that neighbored these other points, and/or that shared some positional or non-positional (e.g., visual characteristic, color value, etc.) commonality with the other points. Specifically, the positional elements or non-positional elements of the other points may be expanded to include a new element that is defined with the values for the one or more inherited or attributed surface normals.

Figure 4:
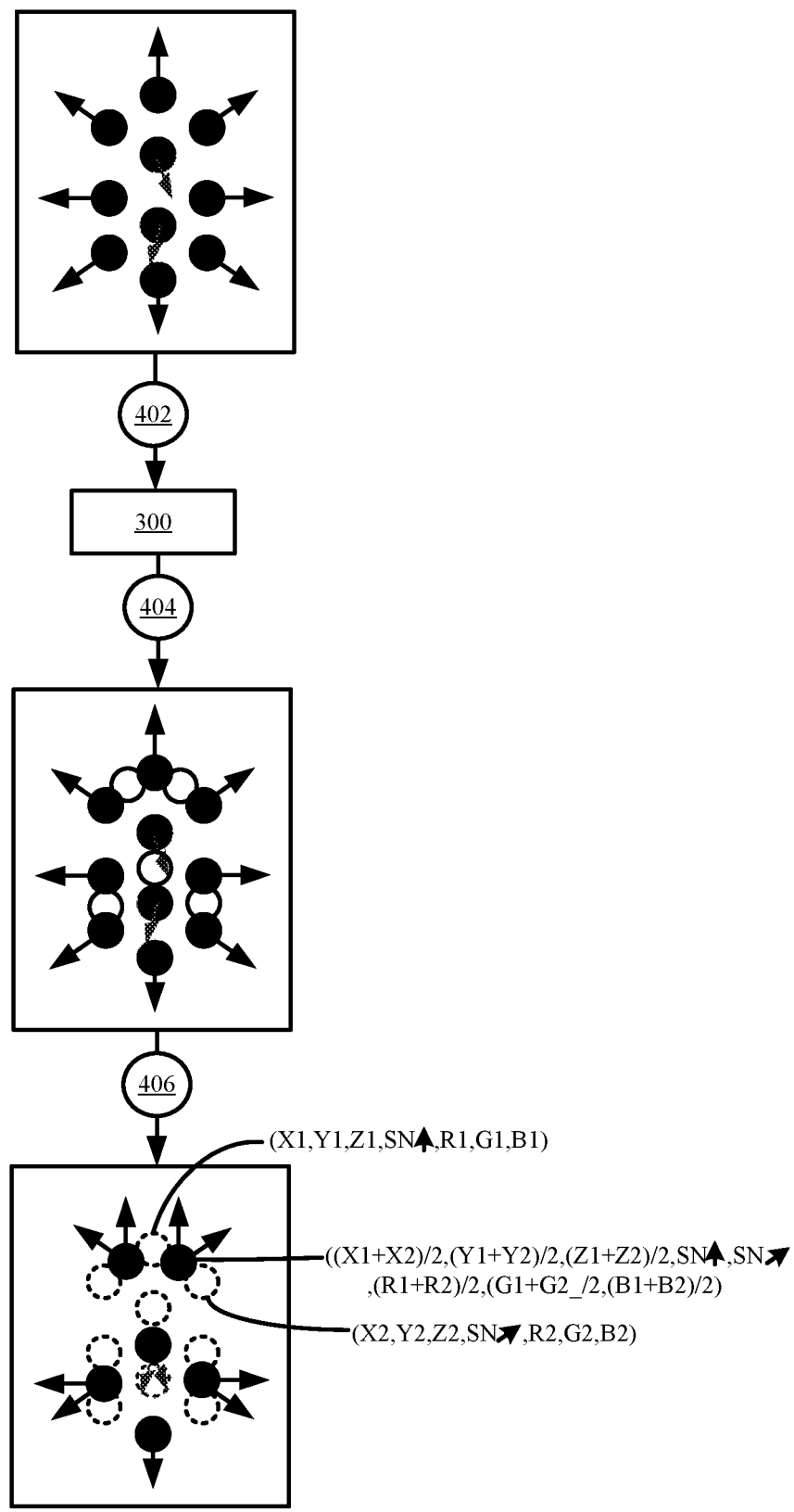
FIG. 4 illustrates an example of defining points with multiple surface normals in response to decimating an original set of points in accordance with some embodiments.

FIG. 4 illustrates an example of defining points with multiple surface normals in response to decimating an original set of points in accordance with some embodiments. Graphics system 300 receives (at 402) the original set of points with a request to decimate the original set of points. The request may be accompanied with a selection of a subset of points to remove from the original set of points, or may be accompanied with decimation criteria that graphics system 300 uses to automatically select the subset of points from the original set of points for removal.

Graphics system 300 determines (at 404) a new points to replace two or more of the subset of points that are selected for decimation. Graphics system 300 bases the determination (at 404) on the proximity between the two or more points selected for decimation. For instance, if two or more points selected for decimation are more than a threshold distance from each other, graphics system 300 will not define a new point to replace those two or more points. However, if two or more points selected for decimation are separated by less than the threshold distance, graphics system 300 determines (at 404) that a new point may be defined to replace those two or more points. Graphics system 300 computes the distance between the points selected for decimation based on the values that are defined for their positional elements. In some embodiments, the determination (at 404) is also based on commonality in the non-positional elements of points that are the threshold distance from one another. For instance, graphics system 300 determines (at 404) that a new point should be defined to replace two or more points that are selected for decimation, that are within the threshold distance from one another, and that are defined with the same or similar color values, reflectivity, transparency, and/or other non-positional elements.

In some embodiments, the determination (at 404) of the new points may be based on the decimation criteria being used to select the subset of points for decimation. For instance, the decimation criteria may specify a 50% reduction in the point cloud size, and graphics system 300 selects every other point of the point cloud to decimate. In this case, graphics system 300 determines (at 404) that a new point should be defined for every pair of points in the subset of points that is selected for decimation. Similarly, graphics system 300 may perform a voxelized decimation in which the space encompassed by the point cloud is partitioned into smaller sized voxels, and the points within each voxel are replaced with a new decimated point that is to be generated at the center of that voxel.

Graphics system 300 defines (at 406) the new points for different combinations of two or more points that are selected for decimation and that are determined (at 404) to be replaced with a new point. Defining (at 406) a new point may include defining the new point at a position that is equidistant or in between the determined (at 404) two or more points. In other words, graphics system 300 may define the positional elements for the new point based on the positional elements of the two or more points (e.g., averaging the positional elements of the two or more points) being replaced by the new point. Defining (at 406) the new point may also include defining the non-positional elements or visual characteristics of the new point based on the non-positional elements of the determined (at 404) two or more points (e.g., averaging the non-positional elements or visual characteristics of the two points) being replaced by that new point. Defining (at 404) the new point further includes adding the surface normals of the two or more points being replaced to the definition of the new point.

Figure 5:
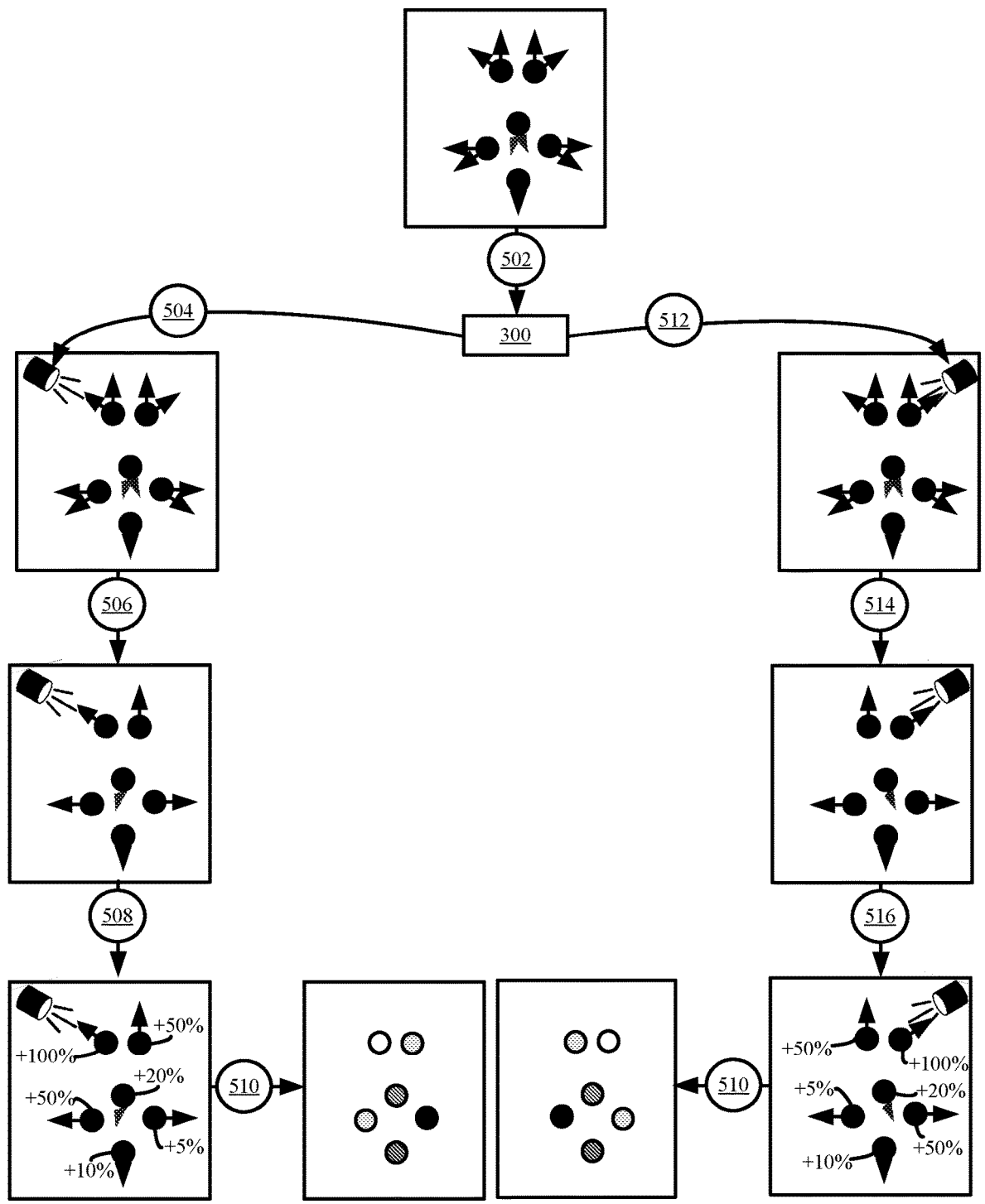
FIG. 5 illustrates an example of improving image quality from rendering a decimated set of image primitives based on the retained surface normals in accordance with some embodiments presented herein.

FIG. 5 illustrates an example of improving image quality from rendering a decimated set of image primitives based on the retained surface normals in accordance with some embodiments presented herein. Graphics system 300 obtains (at 502) a decimated set of primitives for a lower detailed representation of a 3D model. The decimated set of primitives includes primitives that are defined with two or more surface normals. The primitives with two or more surface normals correspond to primitives that incorporate or are defined with the surface normal of an original primitive that has been removed from the 3D model in order to generated the lower detailed or the decimated representation of the 3D model. Graphics system 300 may obtain primitives of a 3D model, and may generate the decimated set of primitives from the obtained primitives. Alternatively, the decimated set of primitives may be stored to a file.

Graphics system 300 defines (at 504) a first light source with which to illuminate the decimated set of primitives. Defining (at 504) the first light source may include placing the first light source with a first position and orientation in the 3D space of the 3D model spanned by the decimated set of primitives. Defining (at 504) the first light source may further include defining properties of the light that is emitted from the first light source. For instance, a user may select between a directional, spot, ambient, diffuse, and/or other types of light, and may specify the intensity, color, brightness, temperature range, and/or other properties of the selected type of light. In some embodiments, graphics system may define (at 504) multiple light sources at different positions to illuminate the 3D model, and each light source may be defined with different properties.

Graphics system 300 determines (at 506) the surface normal of each primitive from the decimated set of primitives that is most directed or aligned towards the first light source. Specifically, graphics system 300 analyzes the direction, angle, or orientation of each surface normal that is defined for each primitive in order to determine (at 506) the surface normal that receives the most light from the first light source as a result of facing or being exposed in the direction of first light source more than other surface normals that are defined for the same primitive.

Graphics system 300 adjusts (at 508) the visual characteristics of the decimated set of primitives based on the amount of light from the first light source and the properties of the first light source that reach each primitive via the determined (at 506) surface normal that is most directed to the first light source and the effect that the received light has on the non-positional elements of each primitive. For instance, if a first primitive has a blue color and has a surface normal that is directed away from the first light source so as to receive only half the light and if the first light source emits red light, then graphics system 300 adjusts (at 508) the blue color of the first primitive according to half the red light reaching the first primitive. If a second primitive has the same blue color and has a surface normal that is directed directly at the first light source, then graphics system 300 adjusts (at 508) the blue color of the second primitive according to all the red light reaching the second primitive. Specifically, the first primitive will have a bluer color than the second primitive, and the second primitive will have a purple color.

Graphics system 300 renders (at 510) the decimated set of primitives at the positions defined by their positional elements with their respective adjusted (at 508) visual characteristics. The rendered visualization will more accurately match the coloring and/or other visual characteristics of the 3D model prior to decimation than if the decimated set of primitives were rendered without accounting for or incorporating the surface normals of the primitives that were removed from the 3D model during decimation.

Graphics system 300 defines (at 512) a second light source with different properties and at a different position than the first light source. In some embodiments, defining (at 512) the second light source involves animating or move the first light source to a different position and/or changing the properties of the light during the animation (e.g., transitioning a light representing the sun from a first position and first properties associated with midday sunlight to a second position and second properties associated with sunlight at dusk).

Graphics system 300 determines (at 514) the surface normal of each primitive from the decimated set of primitives that is most directed or aligned towards the second light source, and adjusts (at 516) the visual characteristics of the decimated set of primitives based on the amount of light from the second light source and the properties of the second light source that reach each primitive via the determined (at 514) surface normal that is most directed to the second light source and the effect that the received light has on the non-positional elements of each primitive.

Figure 6:
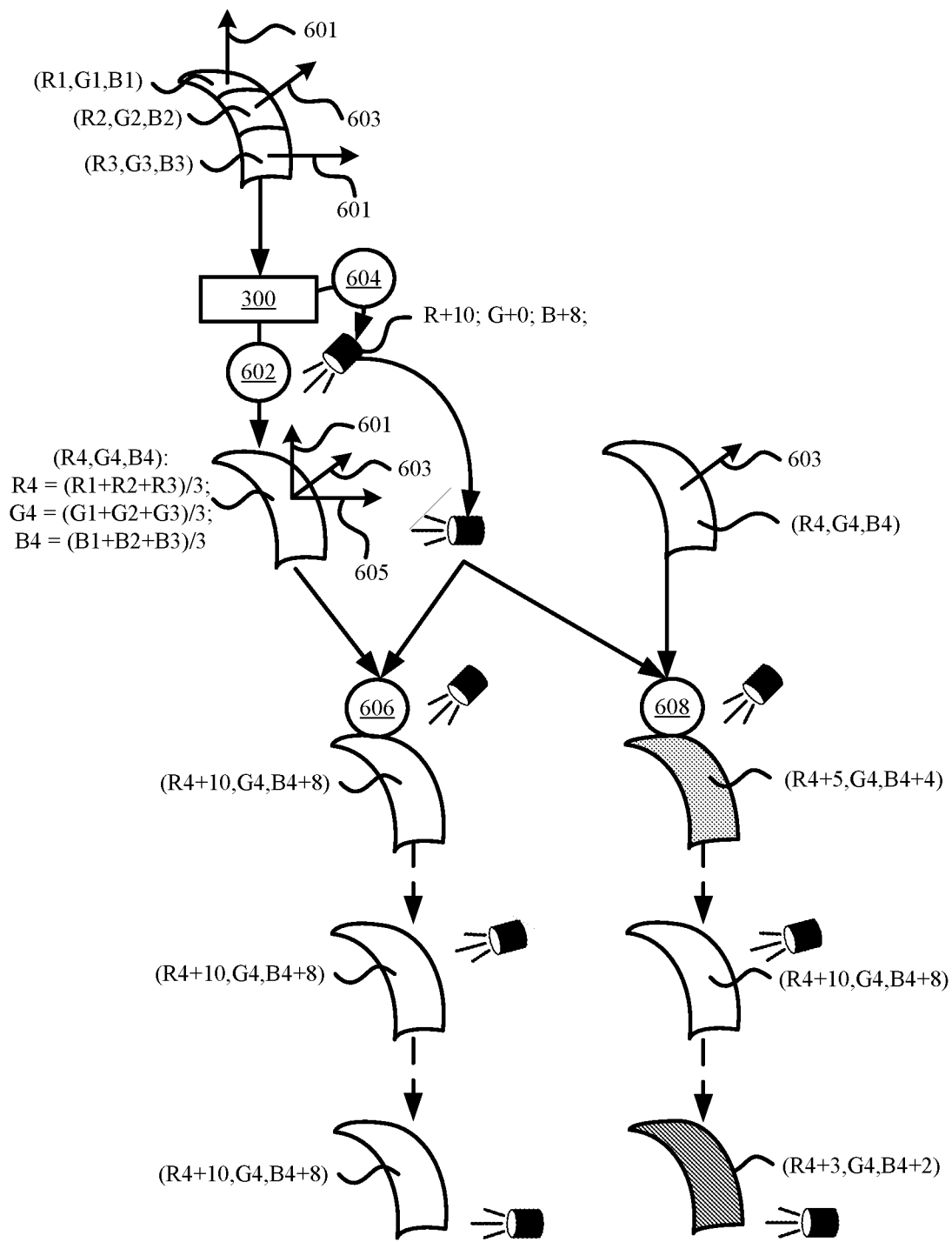
FIG. 6 illustrates an example of the difference in image quality that results from rendering primitives with and without incorporating the surface normals of other primitives that are removed after decimating a 3D model in accordance with some embodiments presented herein.

FIG. 6 illustrates an example of the difference in image quality that results from rendering primitives with and without incorporating the surface normals of other primitives that are removed after decimating a 3D model in accordance with some embodiments presented herein. Graphics system 300 generates (at 602) a decimated 3D mesh representation of a curved surface from a higher resolution representation of the same curved surface that is originally defined with three meshes. In generating (at 602) the decimated 3D mesh, graphics system 300 associates surface normals 601, 603, and 605 from each of the original three meshes to the single decimated 3D mesh that remains after decimating the curved surface.

Graphics system 300 defines (at 604) a directional light source to illuminate the curved surface from different sides, positions, and/or orientations at different times. For instance, graphics system 300 defines (at 604) the directional light source to move and illuminate the curved surface from opposite ends.

Graphics system 300 renders (at 606) the decimated 3D mesh by illuminating the curved surface based on the amount of light reaching whichever surface normal 601, 603, and 605 is most exposed to the light or is angled closest to the directional light source. In this manner, graphics system 300 maintains consistent lighting across the curved surface as the directional light source is moved. For instance, at a first time with the directional light source positioned above the curved surface, graphics system 300 renders (at 606) the decimated 3D mesh based on the properties of the directional light source and the amount of light from the directional light source reaching the mesh via first surface normal 601. At a second time with the directional light source angled towards the curved surface, graphics system 300 renders (at 606) the decimated 3D mesh based on the properties of the directional light source and the amount of light from the directional light source reaching the mesh via second surface normal 603, and at a third time with the directional light source positioned below the curved surface, graphics system 300 renders (at 606) the decimated 3D mesh based on the properties of the directional light source and the amount of light from the directional light source reaching the mesh via third surface normal 605. Accordingly, there are no abrupt shifts in the illumination of the curved surface, no sudden changes in brightness, reflectivity, or colors as the directional light source moves across the decimated 3D mesh.

However, these abrupt and sudden changes in lighting occur in response to rendering (at 608) the decimated 3D mesh with a single surface normal and discarding the surface normals of the meshes or primitives that were removed as a result of decimating the curved surface. For instance, when rendering (at 608) the decimated 3D mesh as the directional light source is moved using only surface normal 603, the visualization of the curved surface would be darker with the directional light source at the first position above the curved surface, brighter with the directional light source at the second position angled towards the curved surface, and darker with the directional light source at the third position positioned below the curved surface. Additionally, the color of the curved surface changes as different amounts of light reach the curved surface via surface normal 603.

As shown in FIG. 6, when the surface normals 601, 603, and 605 of the original meshes used to represent the curved surface at the higher resolution are preserved in the decimated 3D mesh, the lighting and color transitions across the decimated representation of the curved surface (e.g., the decimated 3D mesh) match or are similar to the lighting and color transitions across the undecimated and higher resolution representation of the curved surface (e.g., the original three meshes), whereas when one or more of the surface normals associated with removed meshes are discarded and/or not accounted for during the rendering (at 608) of the decimated 3D mesh, then the lighting and color transitions across the decimated representation of the curved surface differ from the lighting and color transitions across the undecimated and higher resolution representation of the curved surface. Consequently, in the latter case when the surface normal data is not preserved, the generated visualization differs by having a lower resolution or level of detail as a result of fewer primitives being used to generate that visualization, and also differs by having inconsistent or different brightness, contrast, colors, and/or other lighting and color transitions than a visualization that is generated from the original or undecimated representation of the visualization.

Figure 7:
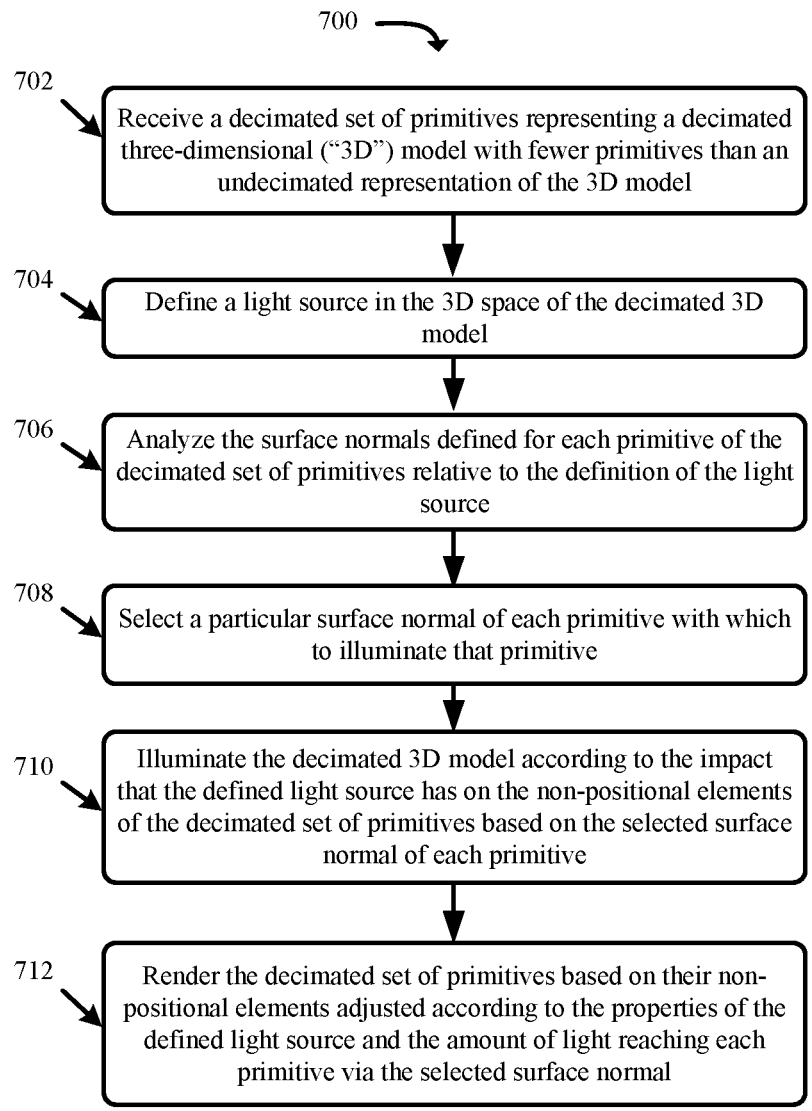
FIG. 7 presents a process for dynamically illuminating a decimated set of primitives based on different surface normals associated with the decimated set of primitives in accordance with some embodiments presented herein.

FIG. 7 presents a process 700 for dynamically illuminating a decimated set of primitives based on different surface normals associated with the decimated set of primitives in accordance with some embodiments presented herein. Process 700 is implemented by graphics system 300.

Process 700 includes receiving (at 702) the decimated set of primitives. The decimated set of primitives represent a 3D model at a lower resolution or with fewer points, meshes, polygons, or other primitives than an undecimated representation of the 3D model.

Process 700 includes defining (at 704) a light source in the 3D space of the decimated 3D model. Defining (at 704) the light source includes defining the type of light and properties of the light with which to illuminate the decimated 3D model.

Process 700 includes analyzing (at 706) the surface normals defined for each primitive of the decimated set of primitives relative to the definition (at 704) of the light source, and selecting (at 708) a particular surface normal of each primitive with which to illuminate that primitive. Analyzing (at 706) the surface normals may include comparing the direction, orientation, and/or magnitude of each surface normal that is defined for a particular primitive to the position, direction, and/or orientation of the defined (at 704) light source, and selecting (at 708) the particular surface normal may include determining the surface normal that is aligned or directed most closely to the light source.

Process 700 includes illuminating (at 710) the decimated 3D model according to the impact that the defined (at 704) light source has on the non-positional elements of the decimated set of primitives based on the selected surface normal of each primitive. Graphics system 300 may illuminate (at 710) the decimated 3D model using any one or more lighting techniques. For instance, graphics system 300 may perform ray tracing, radiosity, beam tracing, cone tracing, path tracing, volumetric path tracing, Metropolis light transport, ambient occlusion, photon mapping, signed distance field, image-based lighting, and/or other lighting techniques to illuminate (at 710) the decimated 3D model. Each lighting technique may perform a different computation for how the light reaches each of the primitives or the positions defined by the positional elements of each primitive. The amount of light that is reflected off each primitive and the direction of the reflected light is determined by the selected surface normal of each primitive. The selected surface normal determines the angle with which the surface represented by a primitive is exposed to or faces the light. Accordingly, illuminating (at 710) the decimated 3D model includes computing an amount of light that reaches and reflects of each primitive based on the selected surface normal of that primitive, and adjusting the coloring, saturation, contrast, hue, brightness, and/or other visual characteristics defined in the non-positional elements of each particular primitive based on the computed amount of light, the properties of the light that is emitted from the light source, and the defined non-positional elements of the particular primitive. For instance, a first primitive with a selected surface normal that exposes that primitive to half the emitted light will be illuminated according to half the emitted light reaching the first primitive, and the color adjustments to the first primitive are calculated based on the properties (e.g., colors) of the emitted light, the non-positional properties of the first primitive, and the effect that emitted light properties at half intensity have on the non-positional properties of the first primitive. Similarly, a second primitive with a selected surface normal that exposes that primitive fully to the emitted light will be more heavily affected by the light. For instance, the second primitive is fully illuminated by the emitted light such that it is rendered more brightly than the first primitive. Additionally, the colors of the second primitive are affected more heavily than the colors of the first primitive because of the greater amount of light reaching the second primitive than the first primitive and the greater affect that the light properties have on the second primitive than the first primitive because of the increased intensity or amount of light reaching the second primitive.

An example of dynamically illuminating a particular primitive includes defining the particular primitive with an original first surface normal and attributing a second surface normal of a removed primitive to the particular primitive. The particular primitive may be defined with a red coloration, and the light may impart blue coloration. The first surface normal may cause a first amount of light to reach the particular primitive, and may change the red coloration to a first purple hue based on the first amount of light reaching the particular primitive via the first surface normal. The second surface normal may cause a second amount of light to reach the particular primitive, and may change the red coloration to a second purple hue based on the second amount of light reaching the particular primitive via the second surface normal. Accordingly, selecting between the different surface normals that are defined for the particular primitive dynamically changes the illumination of that particular primitive.

Process 700 includes rendering (at 712) the decimated set of primitives based on their non-positional elements adjusted according to the properties of the defined (at 704) light source and the amount of light reaching each primitive via the selected (at 708) surface normal. The selected surface normal changes how the light effects the brightness, contrast, hue, saturation, colors, and/or other non-positional elements of the primitives. Rendering (at 712) the decimated set of primitives includes generating a visualization of the decimated 3D model at the resolution of the decimated set of primitives but with the same or lighting effects as the undecimated 3D model.

Figure 8:
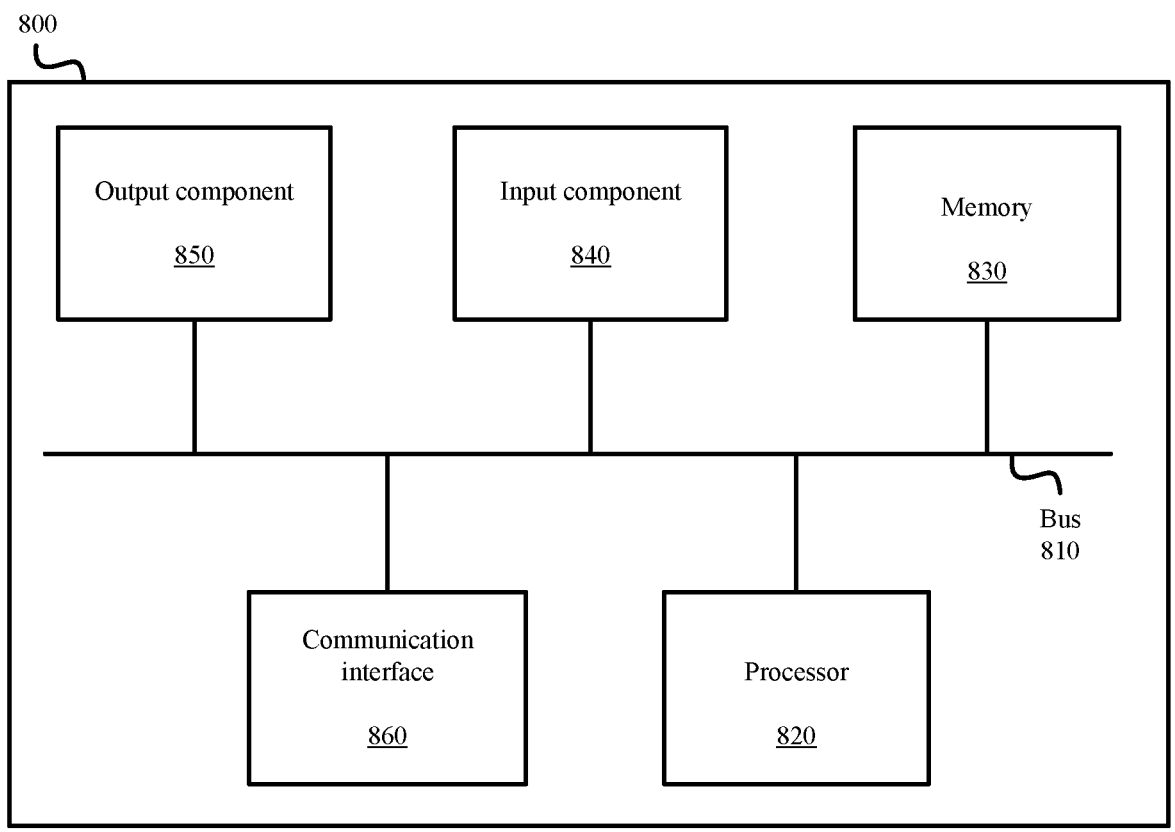
FIG. 8 illustrates example components of one or more devices, according to one or more embodiments described herein.

FIG. 8 is a diagram of example components of device 800. Device 800 may be used to implement one or more of the tools, devices, or systems described above (e.g., Graphics system 300). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
    defining a set of primitives that collectively form a three-dimensional ("3D") representation, wherein each primitive of the set of primitives is defined with a position, visual characteristics, and at least first and second surface normals;
    defining a light source with which to illuminate the set of primitives;
    computing different amounts of light from the light source that reach the first surface normal and the second surface normal of a first primitive from the set of primitives; and
    dynamically generating a visualization for the first primitive at the position of the first primitive based on said computing of the different amounts of light that reach the first surface normal and the second surface normal, wherein dynamically generating the visualization comprises:
        adjusting the visual characteristics of the first primitive according to a first amount of light from the light source that is computed to reach the first primitive via the first surface normal in response to the first amount of light being greater than a second amount of light from the light source that is computed to reach the second surface normal; and
        adjusting the visual characteristics of the first primitive according to the second amount of light from the light source that is computed to reach the first primitive via the second surface normal in response to the second amount of light being greater than the first amount of light.

2. The method of claim 1 further comprising:
    receiving a plurality of primitives that collectively form the 3D representation at a higher resolution than the 3D representation formed by the set of primitives, wherein each primitive of the plurality of primitives is defined with a position, visual characteristics, and a surface normal;
    decimating the plurality of primitives to the set of primitives; and
    wherein defining the set of primitives comprises defining the first and second surface normals of the first primitive with the surface normal of a third primitive from the plurality of primitives and the surface normal of a fourth primitive from the plurality of primitives, wherein the set of primitives comprises fewer primitives than the plurality of primitives.

3. The method of claim 1 further comprising:
    receiving a plurality of primitives that collectively form the 3D representation at a higher resolution than the 3D representation formed by the set of primitives, wherein each primitive of the plurality of primitives is defined with a position, visual characteristics, and a surface normal; and
    wherein defining the set of primitives comprises:
        replacing a third primitive and a fourth primitive from the plurality of primitives with the first primitive;
        defining the position of the first primitive based on the position of the third primitive and the position of the fourth primitive;
        defining the visual characteristics of the first primitive based on the visual characteristics of the third primitive and the visual characteristics of the fourth primitive; and
        defining the first and second normals of the first primitive based on the surface normal of the third primitive and the surface normal of the fourth primitive.

4. The method of claim 1 further comprising:
    receiving a plurality of primitives that collectively form the 3D representation at a higher resolution than the 3D representation formed by the set of primitives, wherein each primitive of the plurality of primitives is defined with a position, visual characteristics, and a surface normal; and
    wherein defining the set of primitives comprises:
        selecting a third primitive from the plurality of primitives to remove and a fourth primitive from the plurality of primitives to retain;
        defining the first and second normals of the first primitive by combining the surface normal of the third primitive with the surface normal of the fourth primitive; and
        removing the third primitive from the set of primitives.

5. The method of claim 1, wherein defining the set of primitives comprises:
    decimating a plurality of primitives to the set of primitives by combining surface normals from two or more primitives of the plurality of primitives into a definition of a single primitive in the set of primitives.

6. The method of claim 1, further comprising:
    determining that the second surface normal of the first primitive receives more light from the light source than the first surface normal, wherein said determining comprises:

determining an orientation or angle of the light source; and determining that the second surface normal is oriented or angled closer to the orientation or angle of the light source than the first surface normal.

7. The method of claim 1, wherein defining the set of primitives comprises:

representing a surface that is originally defined with two or more primitives with a single primitive of the set of primitives; and associating a surface normal from each primitive of the two or more primitives to the single primitive.

8. The method of claim 1, wherein dynamically generating the visualization further comprises:

illuminating the first primitive based on light from the light source reaching a third primitive that was removed from the 3D representation.

9. The method of claim 1 further comprising:

moving the light source from a first position to a second position;

determining that the first surface normal of the first primitive receives more light from the light source at the second position than the second surface normal; and generating an adjusted visualization for the first primitive at the position of the first primitive with the visual characteristics of the first primitive adjusted according to an amount of light from the light source at the second position reaching the first primitive via the first surface normal.

10. The method of claim 1, wherein adjusting the visual characteristics of the first primitive according to the second amount of light comprises:

adjusting a brightness with which the first primitive is rendered in the 3D representation based on the second amount of light.

11. The method of claim 1, wherein the set of primitives comprises a set of meshes or points defined in a 3D space that create a shape and visual characteristics of the 3D representation.

12. The method of claim 1 further comprising:

dynamically reflecting light off the first primitive using one of the first surface normal and the second surface normal of the first primitive, wherein dynamically reflecting light comprises:

generating a visualization of a second primitive from the set of primitives based on the light from the light source reflecting off the first primitive in a direction of the first surface normal as a result of the first amount of light being greater than the second amount of light; and generating the visualization of the second primitive based on the light from the light source reflecting off the first primitive in a direction of the second surface normal as a result of the second amount of light being greater than the first amount of light.

13. A graphics system comprising:

one or more hardware processors configured to:

define a set of primitives that collectively form a three-dimensional ("3D") representation, wherein each primitive of the set of primitives is defined with a position, visual characteristics, and at least first and second surface normals;

define a light source with which to illuminate the set of primitives;

compute different amounts of light from the light source that reach the first surface normal and the second surface normal of a first primitive from the set of primitives; and dynamically generate a visualization for the first primitive at the position of the first primitive based on said computing of the different amounts of light that reach the first surface normal and the second surface normal, wherein dynamically generating the visualization comprises:

adjusting the visual characteristics of the first primitive according to a first amount of light from the light source that is computed to reach the first primitive via the first surface normal in response to the first amount of light being greater than a second amount of light from the light source that is computed to reach the second surface normal; and adjusting the visual characteristics of the first primitive according to the second amount of light from the light source that is computed to reach the first primitive via the second surface normal in response to the second amount of light being greater than the first amount of light.

14. The graphics system of claim 13, wherein the one or more hardware processors are further configured to:

receive a plurality of primitives that collectively form the 3D representation at a higher resolution than the 3D representation formed by the set of primitives, wherein each primitive of the plurality of primitives is defined with a position, visual characteristics, and a surface normal;

decimate the plurality of primitives to the set of primitives; and wherein defining the set of primitives comprises defining the first and second surface normals of the first primitive with the surface normal of a third primitive from the plurality of primitives and the surface normal of a fourth primitive from the plurality of primitives, wherein the set of primitives comprises fewer primitives than the plurality of primitives.

15. The graphics system of claim 13, wherein the one or more hardware processors are further configured to:

receive a plurality of primitives that collectively form the 3D representation at a higher resolution than the 3D representation formed by the set of primitives, wherein each primitive of the plurality of primitives is defined with a position, visual characteristics, and a surface normal; and wherein defining the set of primitives comprises:

replacing a third primitive and a fourth primitive from the plurality of primitives with the first primitive;

defining the position of the first primitive based on the position of the first third primitive and the position of the fourth primitive;

defining the visual characteristics of the first primitive based on the visual characteristics of the third primitive and the visual characteristics of the fourth primitive; and defining the first and second normals of the first primitive based on the surface normal of the third primitive and the surface normal of the fourth primitive.

16. The graphics system of claim 13, wherein the one or more hardware processors are further configured to:

receive a plurality of primitives that collectively form the 3D representation at a higher resolution than the 3D representation formed by the set of primitives, wherein each primitive of the plurality of primitives is defined with a position, visual characteristics, and a surface normal; and wherein defining the set of primitives comprises:
selecting a third primitive from the plurality of primitives to remove and a fourth primitive from the plurality of primitives to retain;
defining the first and second normals of the first primitive by combining the surface normal of the third primitive with the surface normal of the fourth primitive; and
removing the third primitive from the set of primitives.

17. The graphics system of claim 13, wherein defining the set of primitives comprises:
decimating a plurality of primitives to the set of primitives by combining surface normals from two or more primitives of the plurality of primitives into a definition of a single primitive in the set of primitives.

18. The graphics system of claim 13, wherein defining the set of primitives comprises:
representing a surface that is originally defined with two or more primitives with a single primitive of the set of primitives; and
associating a surface normal from each primitive of the two or more primitives to the single primitive.

19. The graphics system of claim 13, wherein the one or more hardware processors are further configured to:
move the light source from a first position to a second position;
determine that the first surface normal of the first primitive receives more light from the light source at the second position than the second surface n normal; and
generate an adjusted visualization for the first primitive at the position of the first primitive with the visual characteristics of the first primitive adjusted according to an amount of light from the light source at the second position reaching the first primitive via the first surface normal.

20. A non-transitory computer-readable medium storing instructions that, when executed by one or more processors of a graphics system, cause the graphics system to perform operations comprising:
defining a set of primitives that collectively form a three-dimensional ("3D") representation, wherein each primitive of the set of primitives is defined with a position, visual characteristics, and at least first and second surface normals;
defining a light source with which to illuminate the set of primitives;
computing different amounts of light from the light source that reach the first surface normal and the second surface normal of a first primitive from the set of primitives; and
dynamically generating a visualization for the first primitive at the position of the first primitive based on said computing of the different amounts of light that reach the first surface normal and the second surface normal, wherein dynamically generating the visualization comprises:
adjusting the visual characteristics of the first primitive according to a first amount of light from the light source that is computed to reach the first primitive via the first surface normal in response to the first amount of light being greater than a second amount of light from the light source that is computed to reach the second surface normal; and
adjusting the visual characteristics of the first primitive according to the second amount of light from the light source that is computed to reach the first primitive via the second surface normal in response to the second amount of light being greater than the first amount of light.

* * * * *